(12) United States Patent
Sollami

(10) Patent No.: US 6,250,535 B1
(45) Date of Patent: Jun. 26, 2001

(54) METHOD FOR BONDING A TUBULAR PART IN COAXIAL RELATIONSHIP WITH A PART HAVING A BORE THEREIN

(75) Inventor: Phillip A. Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 0 days.

(21) Appl. No.: 09/490,103

(22) Filed: Jan. 24, 2000

(51) Int. Cl.[7] .................................................... B21D 39/04
(52) U.S. Cl. ........................ 228/132; 228/125; 228/174
(58) Field of Search ................................... 228/132, 125, 228/171, 174, 135; 403/30, 270

(56) References Cited

U.S. PATENT DOCUMENTS 3,555,964 * 1/1971 Fleming .
5,076,484 * 12/1991 Ito et al. .
5,098,233 * 3/1992 Patterson et al. .

\* cited by examiner

*Primary Examiner*—Clifford C. Shaw
*Assistant Examiner*—Jonathan Johnson
(74) *Attorney, Agent, or Firm*—Robert L. Marsh

(57) ABSTRACT

A tubular part is brazed into coaxial relationship with the bore of a second part having a counter bore for receiving the tubular part by providing a tubular sleeve within the bores of the two parts prior to brazing. After the braze material has cooled the tubular sleeve and any braze material around it is machined out of the bores. In a second embodiment a tubular part is brazed into a recess of the second part before a bore is drilled therein. After the parts are brazed together the bore is drilled through both the tubular part and the second part.

1 Claim, 4 Drawing Sheets

METHOD FOR BONDING A TUBULAR PART IN COAXIAL RELATIONSHIP WITH A PART HAVING A BORE THEREIN

The present invention relates to an improved method for brazing tubular parts in coaxial relationship with the bore of another part where one end of the tubular part nests with respect to the end of a second part.

BACKGROUND OF THE INVENTION

Where a cylindrical member rotates within a complementary cylindrical bore, the useful life of the parts can be extended by providing a counter sink at one of the bore into which is inserted a tubular, hardened wear ring. For example, machines used to cut hard surfaces such as concrete and asphalt have a rotatable cutting wheel with a plurality of cutting tools mounted on the wheel which are moved against a hard surface to advance the cut. Each of the cutting tools has a cylindrical shank which is rotatably mounted in a complementary cylindrical aperture in a mounting block. As disclosed in my co-pending application, Ser. No. 09/121,726 filed Jul. 24, 1998, the useful life of a tool and the mounting block can be extended by providing a tungsten carbide tubular insert at the forward end of the aperture in the mounting block or holder.

It is customary to use a braze to retain parts, such as a tubular insert fitted in a countersink at the end of a cylindrical aperture. The brazing process consists of providing a ring of braze material which is fitted between the inner surface of the countersink and the outer surface of tubular sleeve. The ring of braze material prevents the hardened ring from becoming seated within the countersink until the braze material is heated and melts, after which the ring can be forced into the countersink until it has become seated. After the parts cool, a substantial portion of the braze material should remain between the inner surface of the countersink and the outer surface of the insert to retain the parts in the assembled relationship. I have found, however, that when the braze material melts and a tubular insert is forced into a countersink most of the liquefied braze material flows into the cylindrical bore leaving an insufficient amount of braze material to retain the parts in the assembled relationship. When a tungsten carbide insert is brazed into a countersink around the bore of a tool block, as described above, it has been found that the braze will fail when the tool is subjected to the forces required to cut hard material such as concrete or asphalt.

An improved method is therefore needed for brazing of tubular parts in nested relationship in which a greater portion of braze material would be retained between the parts.

SUMMARY OF THE INVENTION

Briefly, the present invention is embodied in a method of assembling a tubular part in coaxial relationship with the bore of another part where the end of the tubular part nests with respect to the second part. For the purposes of this discussion, two parts are considered to be nest when the end of a first part is complimentary in shape to the end of a second part such that the outer surface of the first part will fit in near proximity to the complementary surface of the second part with the spacing between the surfaces being sufficient for retaining a brazing material. A tubular sleeve having an outer diameter sized to slide within a countersink surrounding the end of a cylindrical bore is an example of parts which can be assembled in nested relationship.

In accordance with the present invention, to braze a tubular part in nested relationship to a second part having a coaxial bore therein, a ring of braze material is provided where the ring has an inner diameter at least equal to the inner diameter of the tubular part, and an outer diameter which is no greater than the outer diameter of the tubular part. The parts are arranged in coaxial relationship with the ring of braze material and a viscous flux positioned between the complementarily shaped surfaces.

A tubular sleeve made of a soft metal material having an outer diameter which is a little larger than the inner diameter of the cylindrical bore is thereafter press fitted into the bore of both the block or holder and slip fitted into the bore of the insert. The assembled parts are thereafter heated, causing the braze material to melt, after which the parts are moved into nested relationship. As the parts are moved into nested relationship, the braze material is retained between the parts by the tubular sleeve fitting into the coaxial tubular bores of the parts.

When the parts are thereafter cooled, causing the braze material to harden, the parts will be retained in the assembled relationship. Thereafter, the soft metal of the tubular sleeve can be removed in a machining process. Following the removal of the tubular sleeve, the parts will be retained together by the braze remaining between them.

In a second embodiment of the invention, a body part can be made having a bore therein and a tubular member brazed into a countersink around one end of the bore. In this embodiment a body part blank for which the bore has not been made therein is provided with an annular recess in the surface thereof. The recess has an outer surface complimentary in shape to the outer surface of the tubular member and the inner surface of the recess forms a cylindrical stub having a diameter slightly less than the inner diameter of the bore of the completed body part. An annular piece of braze material is placed in the recess and the tubular member is positioned over the braze material, and the parts are heated to melt the braze material. After the parts cool the tubular member will be brazed into the countersink. Thereafter the cylindrical stub can be drilled and bored out to form the bore of the body part after which the tubular member will be in a countersink surrounding the bore.

BRIEF DESCRIPTION OF THE DRAWINGS

A better understanding of the present invention will be had after a reading of the following detailed description taken in conjunction with the drawings where.

DETAILED DESCRIPTION OF THE PREFERRED EMBODIMENT

Figure 1:
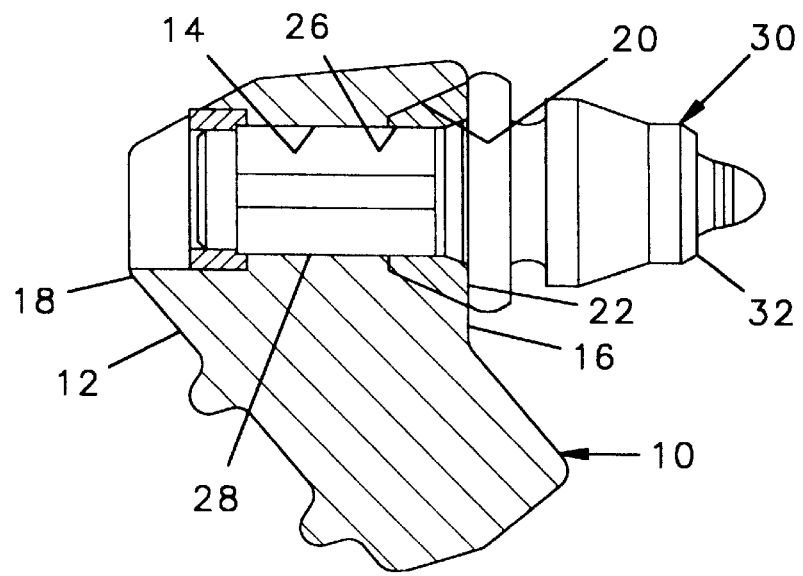
FIG. 1 is a cross sectional view of a mounting block having a cylindrical bore and a hardened metal wear ring into which a rotatable tool has been fitted.
Figure 2:
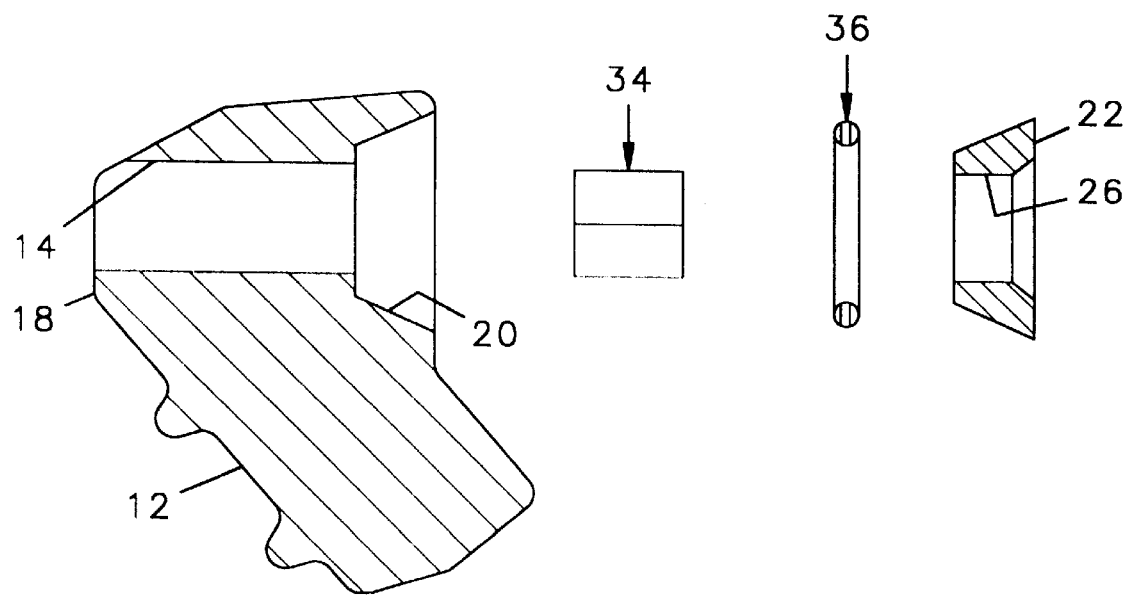
FIG. 2 is an exploded view of the parts needed to braze the wear ring into the countersink surrounding the bore in the block.
Figure 3:
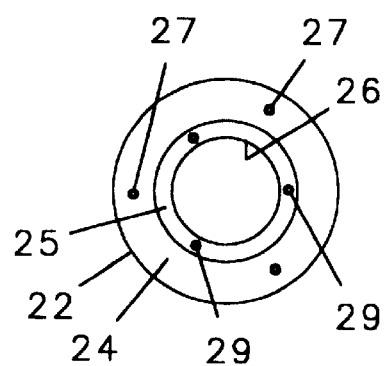
FIG. 3 is a rear end view of the wear ring shown in FIG. 2.

Referring to FIGS. 1 and 3, a machine used to cut hardened material such as concrete has a plurality of mounting blocks 10 fitted around the circumference of wheel. Each mounting block 10 has a block body 12 with a cylindrical bore 14 extending from a forward surface 16 to a rear surface 18. Fitted within a countersink 20 at the forward end of the bore 14 is a tubular tungsten carbide wear ring 22 having an outer surface 24 complementary in shape to the inner surface of the countersink 20 and a cylindrical bore 26 equal to or a little larger than the diameter of bore 14, and a rear surface 25. To provide room for braze material between the outer surface 24 of the wear ring and the inner surface of the countersink 20 a plurality of bumps 27 are spaced around the outer surface 24 of the wear ring 22. Similarly, to space the rear surface 25 from the bottom surface of the countersink 20, a second plurality of bumps 29 are spaced around the rear surface 25 of the wear ring 22.

Fitted into the coaxial bores 14, 26 of the block body 12 and the wear ring 22 is a cylindrical mounting portion 28 of a tool 30 having a tapered forward cutting end 32. The wear ring 22 prevents the cylindrical bore 14 from becoming enlarged as the tool 30 is forced against a hard surface such as concrete or asphalt, however the wear ring 22 will become dislodged from the countersink 20 unless it is adequately retained by braze material between the parts.

Figure 4:
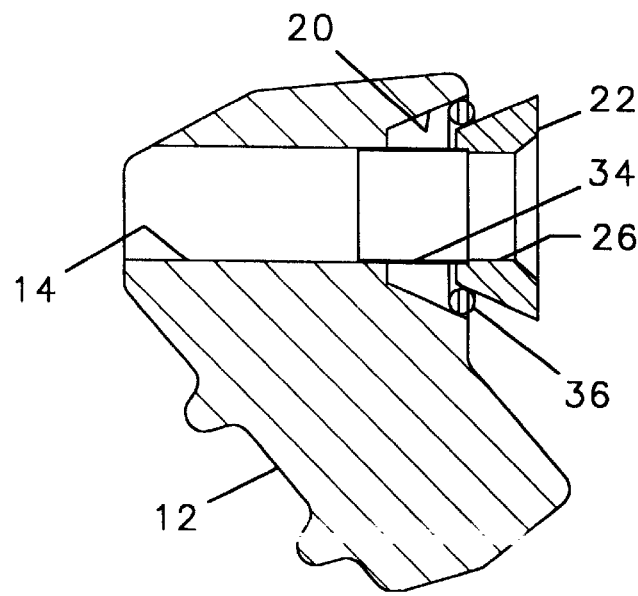
FIG. 4 is a cross sectional view of the parts shown in FIG. 2, assembled prior to brazing.
Figure 5:
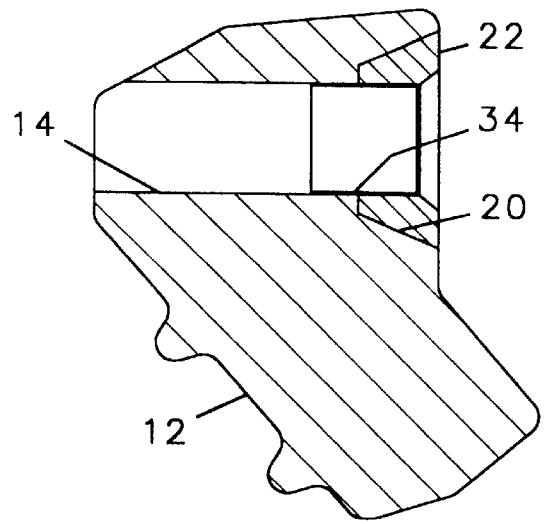
FIG. 5 is a cross sectional view of the parts shown in FIG. 2 after the braze material has been melted.

Referring to FIGS. 2 to 6, in accordance with the present invention, to retain the wear ring 22 within the countersink 20 of the block body 12 a split ring 34 of soft steel is provided having an outer diameter sized to fit snuggly within the bore 14 of the block body 12 and more loosely in the bore 26 of the wear ring 22. A ring of brazing material 36 having a inner diameter larger than the inner diameter of the bore 14 and an outer diameter which is less than the inner diameter of the countersink 20 is fitting around the split ring 34 between the block body 12 and the wear ring 22 as shown in FIG. 4. Thereafter, the parts are subjected to heat until the braze ring 36 melts, after which the wear ring 22 can be seated into the countersink 20 as shown in FIG. 5.

Figure 6:
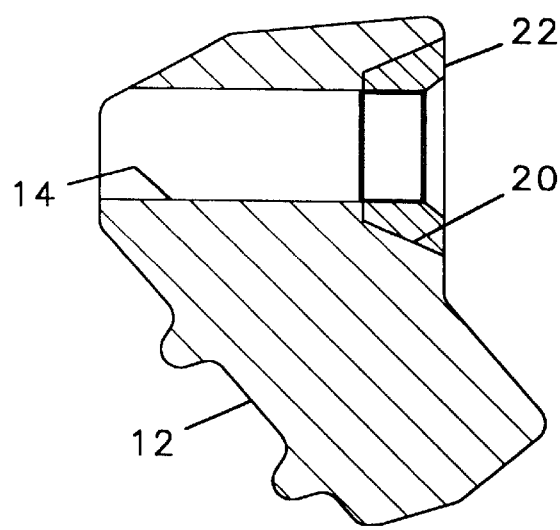
FIG. 6 is a cross sectional view of the parts shown in FIG. 2 after the central sleeve has been machined out of the bore of the block.

After the parts are allowed to cool, hardened braze material will extend between the inner surfaces of all the parts and, in particular, a substantial portion of the braze material will remain between the outer surface 24 of the wear ring 22 and the countersink 20. Thereafter the split ring 34 and any braze material adhering between the outer surface of the split ring 34 and the inner surface of the bores 14, 26 can be machined away as shown in FIG. 6, and adequate braze material will remain between the parts to retain the parts in assembled relationship while the tool 30 is being used to cut a hardened surface, not shown.

In this embodiment the diameter of the bore 26 of the tungsten carbide wear ring 22 has been described as being a little larger than the diameter of the bore 14 of the block body 12 because tungsten carbide is brittle and is susceptible to becoming chipped while the split ring 34 is being machined out of the bore. By providing a bore 26 with a diameter which is a little larger than that of the block body 12, the tungsten carbide will not become chipped while machining the split ring 34 away. It should be appreciated that the invention is usable to facilitate the brazing of many metal and even nonmetal materials, and whereas it is desirable that the bore of a tungsten carbide insert be a little larger than the diameter of the adjacent bore, a different relationship between the dementions of the parts may be desirable where different materials are involved.

It should be appreciated that the method of the present invention can be used to assemble any two parts which are to be retained in nested relationship with a coaxial bore of equal diameter extending between them. Specially, the method can be used to retain any two parts together where the parts having cylindrical bores of equal or nearly equal diameter and having complementary surfaces which fit together in nested relationship with bores thereof aligned in axial relationship to each other.

Figure 7:
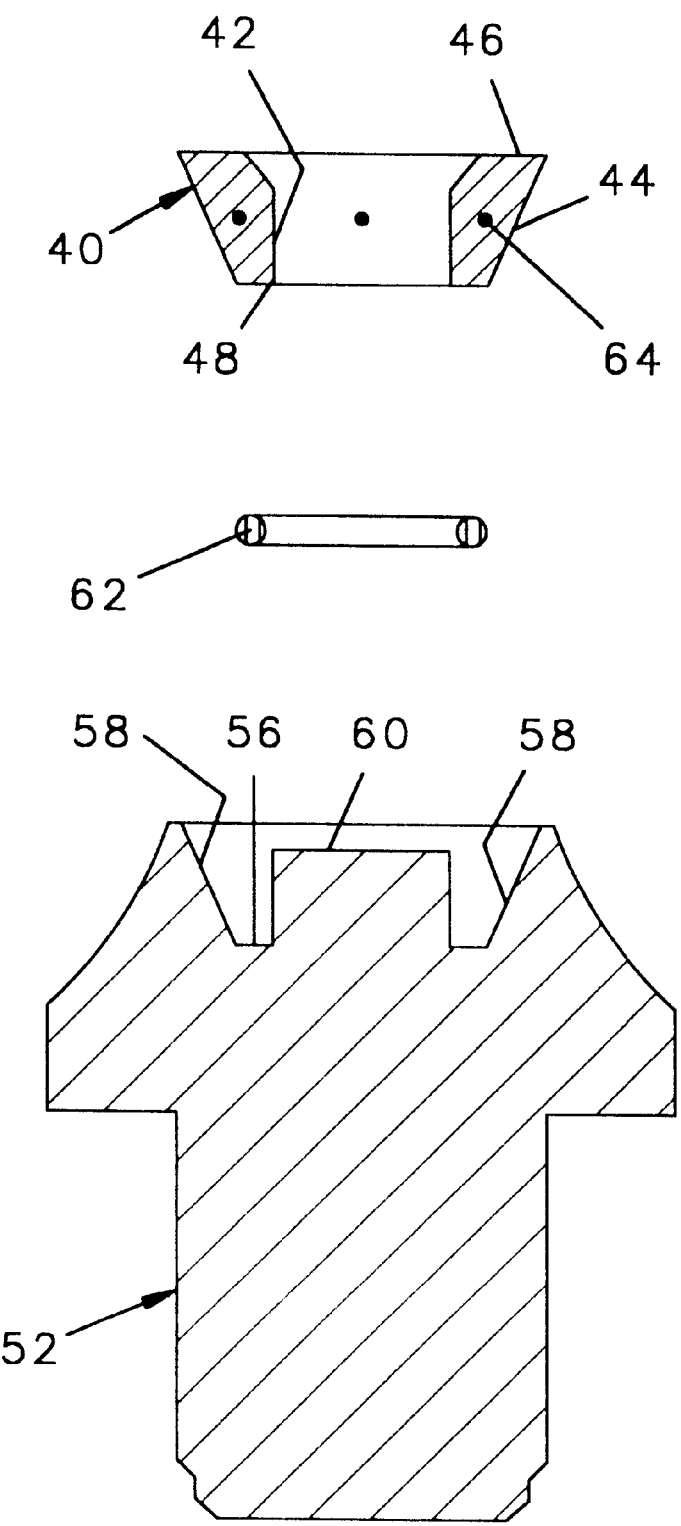
FIG. 7 is an exploded cross sectional view of a partially manufactured tool body having a recess in the forward end thereof suitable for receiving a wear ring and a ring of braze material.
Figure 8:
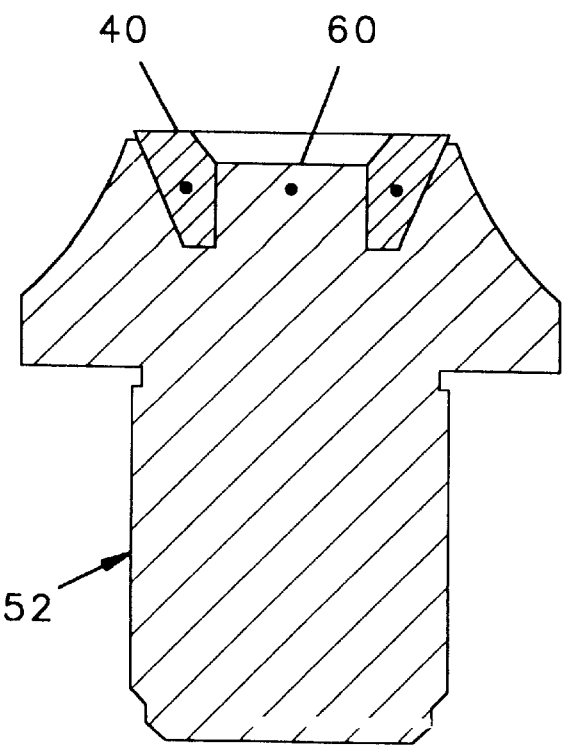
FIG. 8 shows the partially manufactured tool body shown in FIG. 7 with the wear ring brazed into the recess.
Figure 9:
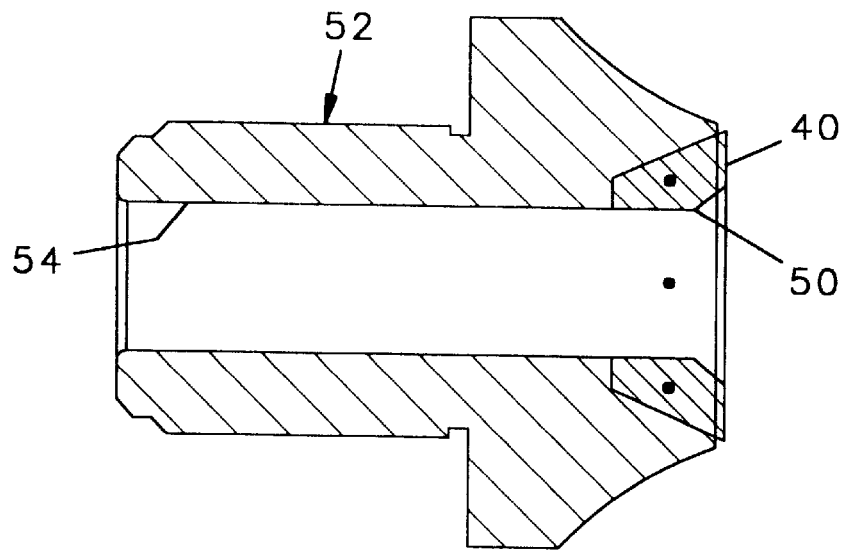
FIG. 9 is a cross sectional view of the tool body shown in FIG. 7 after a bore has been drilled through the length thereof.

Referring to FIGS. 7 to 9, a wear ring 40 having a cylindrical bore 42, a frustoconical outer surface 44 and an annular forward and rear surfaces 46, 48 respectively may be brazed into a countersink 58 in the forward end of a tool body 52 to surround one end of a cylindrical bore 54 in accordance with the second embodiment of the invention.

In accordance with this embodiment, prior to forming the bore 54, an annular recess 56 is formed in the forward end of the tool body 52, the recess having an outer wall 58 complementary in shape to frustoconical outer surface 44 of the wear ring 40. The annular recess 56 also leaves a cylindrical stub 60, the diameter of which is equal to or a little smaller than the inner diameter of the bore 42 of the wear ring 40.

As shown in FIG. 7, a ring of braze material 62 is placed within the recess 56 and around the stub 60, and then the wear ring 40 is fitted within the recess 56 on top of the ring of braze material 62. Preferably, the wear ring 40 has a plurality of protrusions 64—64 on the frustoconical surfaces thereof and has a second plurality of protrusions 65—65 on the rearward surface 48 on the outer surface thereof to space the surfaces of the ring 40 from the surface of the recess 56 in the tool body 52. Heat is then applied to the parts causing the braze material 62 to melt and flow between the surfaces of the recess 56 and the surfaces of the ring 40 and after it has cooled, the ring 40 will be securely bonded into the recess 56 as shown in FIG. 8.

After the ring 40 has been brazed into the recess 56 the tool body 52 can be placed into a lathe or other suitable tool for drilling and boring the bore 54 through the length of the tool body 52 to achieve the completed tool body shown in FIG. 9. The outer surface of the recess 56 defines the outer wall of the countersink 50 of the completed tool body 52.

While the invention has been described with respect to two embodiments, it will be appreciated that many modifications and variations may be made without departing from the true spirit and scope of the invention. It is therefore the intent of the appendent claims to cover such modifications and variations which fall within the true spirit and scope of the invention.

What is claimed is:

1. The method of forming a metal body with a forward surface, a cylindrical bore opening on to said forward surface, said cylindrical bore having a diameter, a countersink in said forward surface and around said cylindrical bore, and a metallic tubular member having a cylindrical central opening, said metallic tubular member brazed into said countersink, said method comprising the steps of providing a blank for said metal body, said blank having a forward surface, said forward surface being without a bore opening therein, providing a metallic tubular member, forming an annular recess in said outer surface, said recess having an outer diameter and an inner wall complementary in shape to said metallic tubular member, providing a ring of braze material having an inner diameter at least equal to said diameter of said cylindrical bore and an outer diameter less than said outer diameter of said annular recess, inserting said braze material into said recess, inserting said metallic tubular member in said recess and against said ring of braze material, heating said blank to melt said braze material, allowing said blank for said metal body and said metal tubular member to cool and become brazed together, and drilling said bore through said forward surface of said blank and through said cylindrical central opening of said metallic tubular member.

* * * * *

UNITED STATES PATENT AND TRADEMARK OFFICE
CERTIFICATE OF CORRECTION

PATENT NO. : 6,250,535 B1
DATED : June 26, 2001
INVENTOR(S) : Phillip A. Sollami It is certified that error appears in the above-identified patent and that said Letters Patent is hereby corrected as shown below:

Column 4,
Line 54, after "opening" delete "on to" and substitute -- onto --

Signed and Sealed this

Twenty-sixth Day of February, 2002

Attest:

Attesting Officer

JAMES E. ROGAN
*Director of the United States Patent and Trademark Office*